(12) United States Patent
LeFevre et al.

(10) Patent No.: US 11,794,251 B2
(45) Date of Patent: Oct. 24, 2023

(54) METAL DROP EJECTING THREE-DIMENSIONAL (3D) OBJECT PRINTER AND METHOD FOR PREPARING THE METAL DROP EJECTING 3D OBJECT PRINTER FOR PRINTING

(71) Applicant: Xerox Corporation, Norwalk, CT (US)

(72) Inventors: Jason M. LeFevre, Penfield, NY (US); Joseph C. Sheflin, Macedon, NY (US); Paul J. McConville, Webster, NY (US); Joshua Hilton, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 17/147,773

(22) Filed: Jan. 13, 2021

(65) Prior Publication Data
US 2022/0219238 A1    Jul. 14, 2022

(51) Int. Cl.
| | | |
|---|---|---|
| *B22F 10/22* | (2021.01) | |
| *B33Y 30/00* | (2015.01) | |
| *B33Y 50/02* | (2015.01) | |
| *B22F 12/53* | (2021.01) | |
| *B22F 10/85* | (2021.01) | |
| *B29C 64/371* | (2017.01) | |

(Continued)

(52) U.S. Cl.
CPC ............ *B22F 10/22* (2021.01); *B22D 23/003* (2013.01); *B22F 10/85* (2021.01); *B22F 12/53* (2021.01); *B29C 64/371* (2017.08); *B33Y 10/00* (2014.12); *B33Y 30/00* (2014.12); *B33Y 50/02* (2014.12); *B22F 2301/052* (2013.01)

(58) Field of Classification Search
CPC ........ B22D 23/003; B22F 10/22; B22F 10/85; B22F 12/53; B22F 2301/052; B33Y 10/00; B33Y 30/00; B33Y 40/00; B33Y 50/02; B29C 64/364; B29C 64/371; B41J 2/04
See application file for complete search history.

(56) References Cited

U.S. PATENT DOCUMENTS

| | | |
|---|---|---|
| 9,616,494 B2 | 4/2017 | Vader et al. |
| 10,040,119 B2 | 8/2018 | Vader et al. |

(Continued)

OTHER PUBLICATIONS

European Patent Office, Extended European Search Report corresponding to European Patent Application No. 22 150 215.6 (9 pages), dated May 30, 2022, Munich, Germany.

(Continued)

*Primary Examiner* — George R Koch
*Assistant Examiner* — Jimmy R Smith, Jr.
(74) *Attorney, Agent, or Firm* — Maginot Moore & Beck LLP

(57) ABSTRACT

A three-dimensional (3D) metal object manufacturing apparatus is equipped with a removable vessel to reduce the time required for start-up procedures after the printer is serviced. The removable vessel is filled with solid metal that is heated to its melting temperature before the bulk wire is inserted into the vessel to commence printing operations. The melting of the solid metal in the removable vessel requires less time that the melting of an length of bulk wire adequate to produce a volume of melted metal suitable for printer operation. The solid metal in the removable vessel can be metal pellets, metal powder, or a solid metal insert.

22 Claims, 6 Drawing Sheets

(51) Int. Cl.
    *B33Y 10/00*         (2015.01)
    *B22D 23/00*       (2006.01)

(56) References Cited

U.S. PATENT DOCUMENTS

2018/0345573 A1\* 12/2018 Zinniel ................... B21C 33/02
2019/0255611 A1    8/2019 Frank et al.

OTHER PUBLICATIONS

Sukhotskiy, V. et al., "Magnetohydrodynamic Drop-on-Demand Liquid Metal Additive Manufacturing: System Overview and Modelling," Jun. 7-9, 2018, Proceedings of 5th International Conference on Fluid Flow, Heat and Mass Transfer (FFHMT'18), Paper No. 155, pp. 155-1-155-6 (6 pages).

\* cited by examiner

METAL DROP EJECTING THREE-DIMENSIONAL (3D) OBJECT PRINTER AND METHOD FOR PREPARING THE METAL DROP EJECTING 3D OBJECT PRINTER FOR PRINTING

CROSS-REFERENCED APPLICATION

This disclosure cross-references U.S. patent application Ser. No. 17/147,810, which is entitle "A Removable Vessel And Metal Insert For Preparing A Metal Drop Ejecting Three-Dimensional (3D) Object Printer For Printing," which was filed on Jan. 13, 2021, and which is hereby incorporated in its entirety in this co-pending application.

TECHNICAL FIELD

This disclosure is directed to three-dimensional (3D) object printers that eject melted metal drops to form objects and, more particularly, to the preparation of such printers for object printing operations.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. The chamber is made of non-conductive material around which an uninsulated electrical wire is wrapped. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic (MHD) printer.

The ejector used in MHD printers includes internal components that need periodic replacement to maintain the operational status of the printer. Some components require replacement approximately every eight hours. After the components are replaced, the printer must go through a start-up process before it can be used for object production again. A portion of this start-up process is the filling of the ejector with melted metal. In the wire-fed MHD printer discussed above, this part of the process is lengthy as enough wire has to be fed into the heated portion of the ejector and melted. In some MHD printers, ten minutes or more may be required to melt enough wire to fill the ejector. Other aspects of the start-up process need about twenty minutes to perform. Thus, the overall start-up process can require an half-hour or more with one-third of that time being consumed by the refilling of the ejector with melted metal.

The time required for wire melting to fill the ejector cannot be reduced by simply increasing the rate at which the wire is fed to the heated chamber of the ejector. Increasing the feed rate results in the tip of the wire impacting the wall of the heated chamber because the wire encounters the wall above the level of the melted metal present in the chamber. The ejector is typically made of high temperature ceramic material, which is sensitive to the impact of the solid wire tip and may be damaged by this contact. Being able to reduce the time for filling the ejector of a MHD printer at start-up without risking damage to the heated chamber would be beneficial.

SUMMARY

A new method of operating a 3D metal object printer reduces the time required for filling the ejector of a MHD printer without damage to the heated chamber. The method includes placing solid metal into a receptacle of a removable vessel, installing the removable vessel into the metal drop ejecting additive manufacturing apparatus, and activating a heater in the metal drop ejecting additive manufacturing apparatus to a temperature that melts the solid metal within the removable vessel.

A new 3D metal object printer reduces the time required for filling the ejector of a MHD printer without damage to the heated chamber. The 3D metal object printer includes an ejector head having a removable vessel with a receptacle within the movable vessel, a heater configured to heat the removable vessel while the removable vessel is in the ejector head to a temperature sufficient to melt solid metal within the receptacle of the removable vessel, a platform positioned opposite the ejector head, at least one actuator operatively connected to at least one of the platform and the ejector head, the at least one actuator being configured to move the at least one of the platform and the ejector head relative to one another, and a controller operatively connected to the heater, the ejector head, and the at least one actuator. The controller is configured to operate the heater to melt solid metal within the receptacle of the removable vessel, operate the ejector head to eject drops of melted metal toward the platform, and operate the at least one actuator to move the ejector head and the platform relative to one another while the ejector head is ejecting melted metal drops toward the platform.

BRIEF DESCRIPTION OF THE DRAWINGS

The foregoing aspects and other features of a method of operating a 3D metal object printer and a new 3D metal object printer with a new removable vessel configured for receiving a metal insert that reduces the time required for filling the ejector of a MHD printer without damage to the heated chamber are explained in the following description, taken in connection with the accompanying drawings.

DETAILED DESCRIPTION

Figure 1:
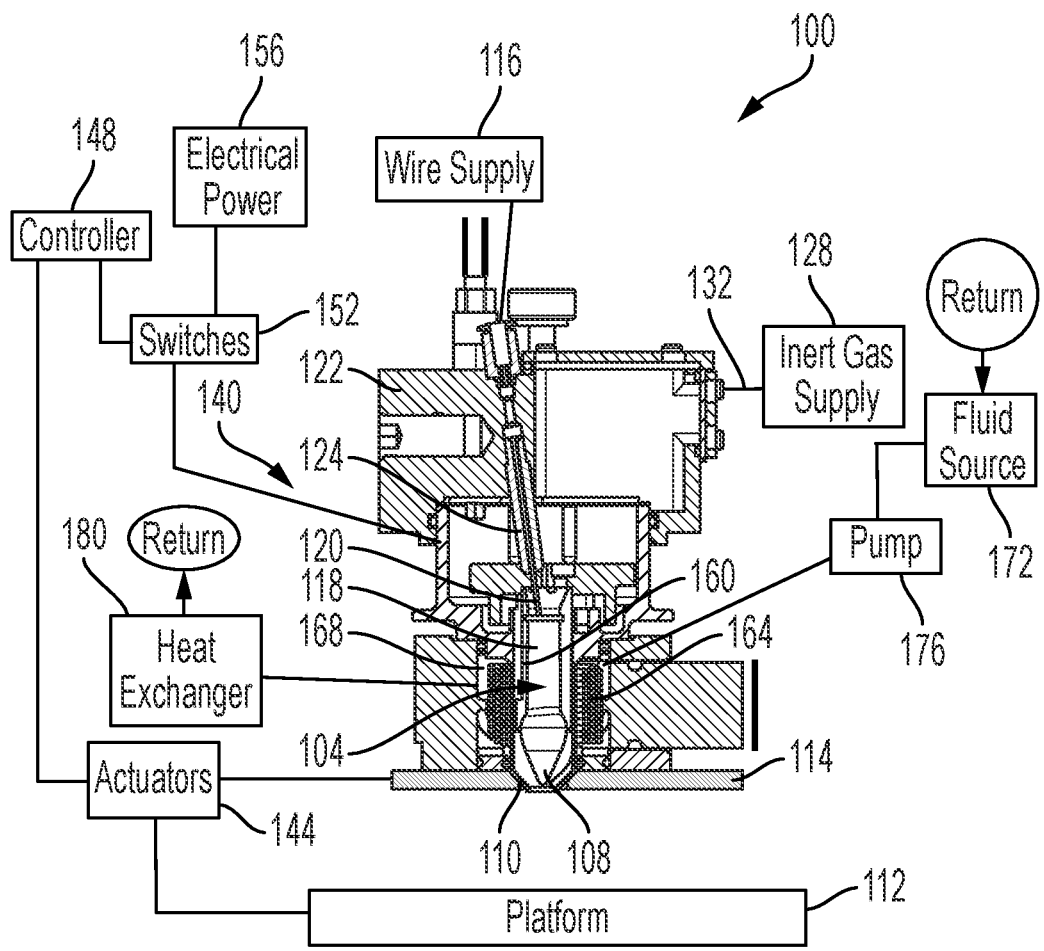
FIG. 1 depicts a new 3D metal object printer that reduces the time required for filling the ejector of a MHD printer without damage to the heated chamber.

For a general understanding of the environment for the 3D metal object printer and its operation as disclosed herein as well as the details for the printer and its operation, reference is made to the drawings. In the drawings, like reference numerals designate like elements.

FIG. 1 illustrates an embodiment of a new 3D metal object printer 100 that reduces the time required for filling the ejector of a MHD printer without damage to the heated chamber of the ejector head. In the printer of FIG. 1, drops of melted bulk metal are ejected from a removable vessel 104 having a single nozzle 108 and drops from the nozzle form swaths for layers of an object on a platform 112. As used in this document, the term "removable vessel" means a hollow container having a receptacle configured to hold a liquid or solid substance and the container as a whole is configured for installation and removal in a 3D metal object printer. As used in this document, the term "bulk metal" means conductive metal available in aggregate form, such as wire of a commonly available gauge or pellets of macro-sized proportions. A source of bulk metal 116, such as metal wire 120, is fed into a wire guide 124 that extends through the upper housing 122 in the ejector head 140 and melted in the removable vessel 104 to provide melted metal for ejection from the nozzle 108 through an orifice 110 in a baseplate 114 of the ejector head 140. As used in this document, the term "nozzle" means an orifice in a removable vessel configured for the expulsion of melted metal drops from the receptacle within the removable vessel. As used in this document, the term "ejector head" means the housing and components of a 3D metal object printer that melt, eject, and regulate the ejection of melted metal drops for the production of metal objects. The level of the volume of melted metal in the removable vessel 104 is maintained at the upper level 118 of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops.

The ejector head 140 is movably mounted within z-axis tracks for vertical movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and an uppermost surface of an object on the platform 112.

Moving the platform 112 in the X-Y plane as drops of molten metal are ejected toward the platform 112 forms a swath of melted metal drops on the object being formed. Controller 148 also operates actuators 144 to adjust the vertical distance between the ejector head 140 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

The controller 148 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148 from either a scanning system or an online or work station connection for processing and generation of the signals that operate the components of the printer 100 to form an object on the platform 112.

Among these components are the switches 152. One switch 152 can be selectively operated to provide electrical power from source 156 to the heater 160, while another switch 152 can be operated to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls in which a heater, a coil, and a removable vessel of a 3D metal object printer are located. The removable vessel 104 and the heater 160 are located within this chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148, the controller can access through a server or the like a remote database in which the digital data model is stored, or a computer-readable medium in which the digital data model is stored can be selectively coupled to the controller 148 for access. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and the uppermost layer of the object on the platform 112.

Figure 2A:
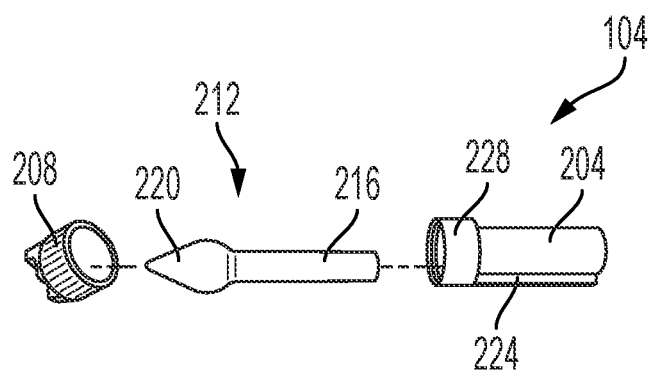
FIG. 2A is a side view of a two part removable vessel used in the 3D metal object printer of FIG. 1 with the metal insert used in the removable vessel to reduce the time required for filling the ejector of a MHD printer without damage to the heated chamber.

FIG. 2A is a side view of the removable vessel 104 of the printer 100. This embodiment of the removable vessel 104 is of two piece construction that includes an upper housing 204 and a lower housing 208. As used in this document, the term "housing" means a structure having a portion of a receptacle within it and that is configured to be secured to another structure to form a removable vessel. The lower housing 208 includes the nozzle 108 (shown in FIG. 1). Upper housing 204 is longer than lower housing 208 and includes a collar 228 having an external circumference that is equal to the external circumference of lower housing 208. The opening of the lower housing 208 that is opposite the nozzle in the lower housing 208 has a flange that extends from the opening and that has a circumference that is less than the circumference of the interior circumference of the collar 228. Collar 228 has an instep that is recessed from the end of the upper housing 204 that is secured to the lower housing 208 by a distance that corresponds to the distance the flange of the lower housing extends from the lower housing. Thus, the flange of the lower housing slides within the collar 228 until it contacts the instep of the upper housing 204 to fit within the internal circumference of the collar 228. When the upper housing 204 and the lower housing 208 are assembled, they form a receptacle having a shape that corresponds to the metal insert 212. Metal insert 212 is a solid piece of metal having an elongated and rounded stem 216 and a bulbous portion 220 that terminates in a pointed end that fits within the nozzle 108. As used in this document, the term "elongated" means structure that is longer than it is wide and the term "rounded" means structure that has at least a partial cylindrical shape. As used in this document, the term "bulbous" means structure having a conical shape along at least a portion of its longitudinal axis. Upper housing 204 also is formed with a guiding flange 224. This flange fits within a groove in the ejector head 140 to orient the removable vessel 104 correctly within the printer 100 and hold the vessel in its correct orientation after the vessel is installed in the ejector head 140.

The upper housing 204 is formed with boron nitride and the lower housing 208 is formed with graphite. Both of these materials are high temperature ceramics. In one embodiment, the upper and lower housings are heated to temperatures in the range of about 800° C. to about 850° C. for periods of eight hours or longer. The receptacle within the removable vessel 104 can be coated with suitable anti-oxidant retardant materials that help attenuate the formation of oxides on the metal insert. As used in this document, the term "anti-oxidant retardant" means any material that attenuates the formation of a metal oxide on the type of metal placed in the receptacle of the removable vessel. The boron nitride forming the upper housing is not electrically conductive so it does not interfere with the generation of the electric fields used to eject melted metal drops from the receptacle through the nozzle 108 and the orifice 110. The overall dimensions of the assembled removable vessel are 55 mm with the length of the upper housing being 40 mm and the length of the lower housing being 15 mm. The circumference of the upper housing at the collar 228 is about 50 mm with a diameter of about 16 mm and the circumference at the widest portion of the lower housing is about 50 mm with a diameter of about 16 mm.

Figure 2B:
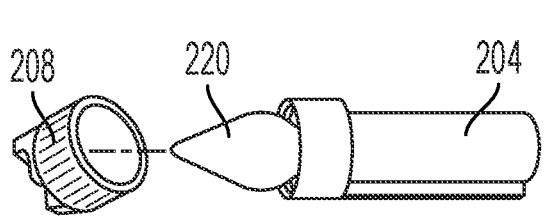
FIG. 2B is a side view depicting the metal insert after one end of the insert has been installed into an upper housing of the removable vessel shown in FIG. 2A.
Figure 2C:
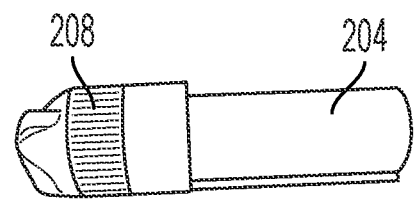
FIG. 2C is a side view of the assembled removable vessel with the installed metal insert.
Figure 2D:
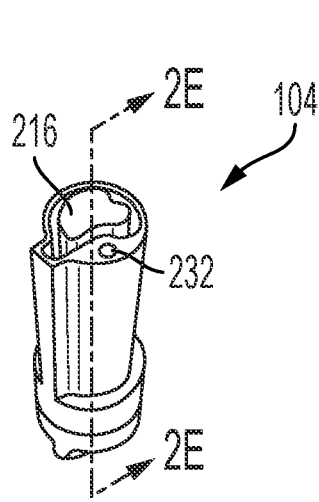
FIG. 2D is an end view of the assembled removable vessel with the installed metal insert.

Prior to installation in the ejector head 140 of the printer 100, the metal insert 212 is loaded into the removable vessel 104. This is done by either pushing the stem 216 of the insert 212 into the portion of the receptacle in the upper housing 204 (FIG. 2B) or by pushing the pointed end of the bulbous portion 220 into the lower housing. A few spots of cyanoacrylate glue, sometimes more commonly known as "super glue," are applied to either the instep of the lower housing 208 or the inner circumference of collar 228 and then the instep of the lower housing 208 is slid within the inner circumference of collar 228 to secure the lower housing and upper housing together as shown in FIG. 2C. This glue is removed by the heat applied from the heater 160 during operation of the printer so the two housings can be separated for printer maintenance. As shown in FIG. 2D, the stem 216 is visible through an opening in the upper housing. This opening is opposite the wire guide 124 to receive wire 120 once the metal insert 212 has been melted in the removable vessel 104. Inert gas source 128 is coupled to the upper housing to supply insert gas to the receptacle within the removable vessel so the environment within the removable vessel does not cause the melted metal within the receptacle of the vessel to oxidize. A thermocouple (not shown) is placed in the opening 232 to provide a signal indicative of the heat in the removable vessel so the controller can regulate the operation of the heater 160.

Figure 2E:
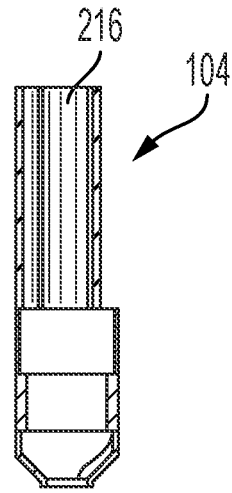
FIG. 2E is a cross-sectional view of an alternative embodiment of a single piece removable vessel for use with the printer of FIG. 1.

FIG. 2E is a cross-sectional view of an alternative embodiment of the removable vessel. This vessel 104 is an integral structure. That is, the vessel has a single housing with a nozzle at one end and an open end at the other. To fill this embodiment, the metal insert 216 is comprised of pelletized solid metal or solid metal powder, which is poured through the opening that receives the wire. In a similarly manner, the embodiment of the removable vessel 104 shown in FIG. 2A to FIG. 2D can be assembled first and then pelletized solid metal or solid metal powder poured through the opening in the upper housing to fill the vessel. The guiding flange 224 slides within a mounting groove in the ejector head 140 to orient the removable vessel during installation and to maintain that orientation in the printer.

Figure 3:
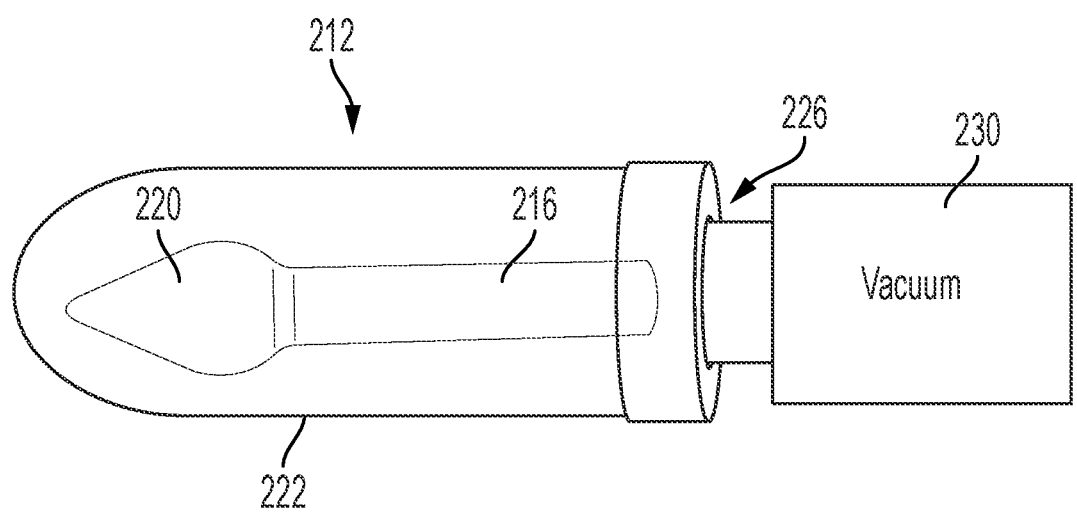
FIG. 3 is a side view of the metal insert for use with the two piece embodiment of the removable vessel shown in FIG. 2A to FIG. 2D.

As noted in the description of the removable vessel presented above with regard to FIG. 2A to FIG. 2D, the metal insert 212 is a solid piece of metal having an elongated and rounded stem 216 and a bulbous portion 220 that terminates in a pointed end that fits within the nozzle 108. After the metal insert is manufactured, it is stored in a container 222 as shown in FIG. 3. The container 222 is sealed with a lid 226 having a self-sealing hole that is connected to a vacuum 230 so air can be removed from the container before shipping. Removal of the air helps impede the formation of oxide on the solid metal. As the conduit connecting the vacuum to the interior of the container 22 is removed, the self-sealing hole closes to retain the vacuum in the container. The metal insert 212 is dimensioned to slide easily into the receptacle formed by the upper and lower housings. Thus, for the embodiment described above, the length of the stem 216 from the junction with the bulbous portion 220 to the end of the stem is 32 mm and the circumference of the stem is 8.5 mm, which narrows slightly towards its end so the stem fits easily in the horizontal cross-sectional area of the receptacle in the upper housing. The circumference of the bulbous portion near the junction with the stem 216 is about 37.7 mm with a diameter of about 12 mm and the length of the bulbous portion from the junction with the stem to the pointed end is 19 mm. In some embodiments, the metal insert is coated with various coatings to impede oxidation, such as paraffin wax or the like. The metal insert is made of solid metal, such as bulk aluminum or other known metals that can be used in metal drop ejecting printers.

Figure 4:
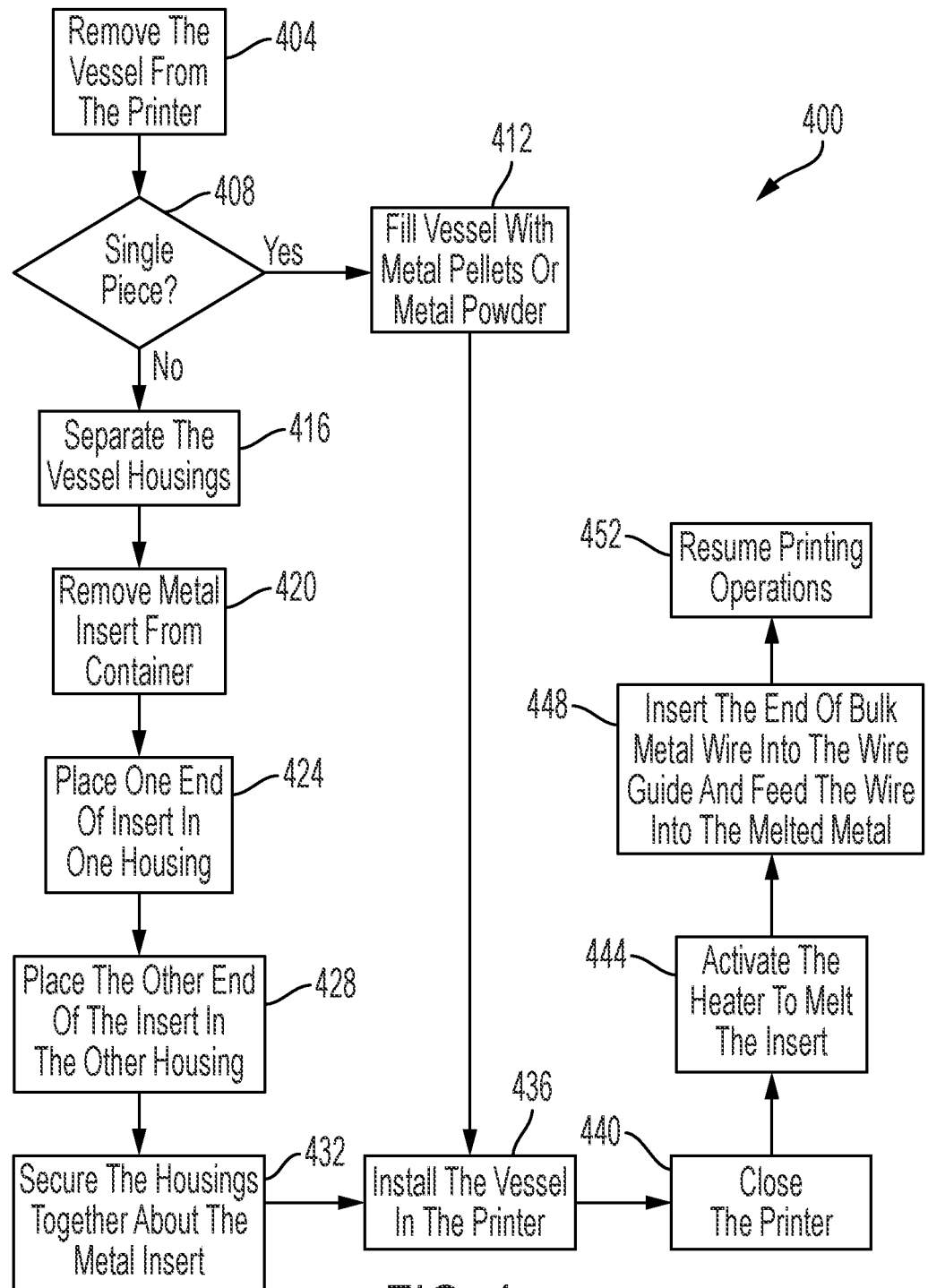
FIG. 4 is a flow diagram for a process that uses the removable vessel and metal insert of the 3D metal object printer of FIG. 1 to fill the removable vessel with melted metal during the start-up process for the 3D metal object printer.

A process for operating a material deposition 3D object printer to reduce the time required to prepare a removable vessel for printing operations is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 4 is a flow diagram for a process 400 that uses the removable vessel and metal insert in the 3D metal object printer of FIG. 1 to fill the removable vessel with melted metal during the start-up process for the 3D metal object printer. The process begins with the removal of the removable vessel 104 from a 3D metal object printer that has been taken offline and allowed to cool (block 404). The removable vessel is filled with solid metal. When the removable vessel is the single piece construction embodiment (block 408), then the vessel is filled by pouring solid metal pellets or solid metal powder through the opening in the end of the vessel into which the bulk wire is later inserted (block 412). In the two piece embodiment of the removable vessel, the vessel is separated into its two parts (block 416) and the metal insert is removed from its container that impedes the formation of oxide (block 420). The elongated and rounded end of the metal insert is placed in the upper housing of the vessel (block 424) and then the bulbous end is inserted in the lower housing (block 428). The upper and lower housings are then secured to one another (block 432). Alternatively, the two piece embodiment can be filled with metal powder or metal pellets if the housings remained secured to one another. Once the removable vessel is filled with solid metal, it is installed within the heater in the 3D metal object printer (block 436) and the printer is closed (block 440). The heater is activated to bring the removable vessel to a temperature that melts the solid metal so the vessel is filled with melted metal (block 444) and the bulk metal wire is inserted into the wire guide so the end of the wire from the wire supply can be positioned within the melted metal in the removable vessel (block 448). The printer can then resume operations for producing metal objects (block 452).

Figure 5:
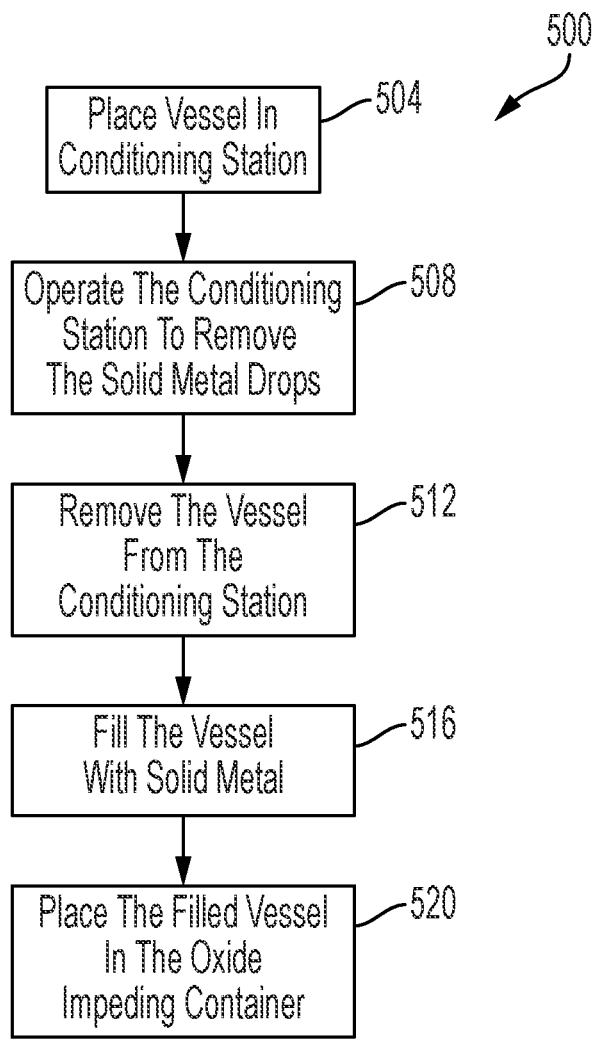
FIG. 5 is a flow diagram for a process that reconditions the removable vessel of FIG. 2A.

From time to time, when the vessel is removed from a printer, the vessel needs to be reconditioned. Reconditioning the two-piece removable vessel, as used in this document, means the lower housing is replaced and the upper housing is swabbed with a cleaning solvent to remove hardened aluminum from the chamber within the upper housing. A method of reconditioning a single piece removable vessel is shown in FIG. 5. The process 500 begins with the vessel or at least the lower housing of the single piece embodiment of the vessel being placed within one of the reconditioning stations (block 504) shown in FIG. 6A, FIG. 6B, or FIG. 6C. The conditioning station is then operated to remove the solidified metal drops from the external surface of the nozzle (block 508). When the removal is complete, the vessel is removed (block 512) and filled with solid metal as previously described (block 516) and then stored in a container, such as container 222, that impedes oxide formation on the metal insert (block 520).

Figure 6A:
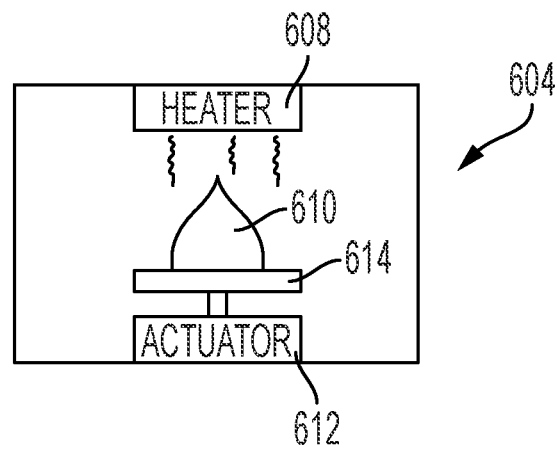
FIG. 6A is an illustration of a thermal reconditioning station that can be used in the process of FIG. 5.
Figure 6B:
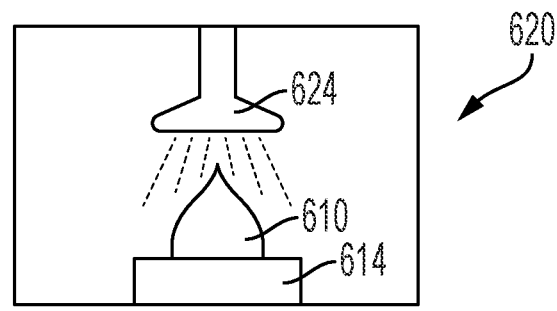
FIG. 6B is an illustration of a chemical reconditioning station that can be used in the process of FIG. 5.
Figure 6C:
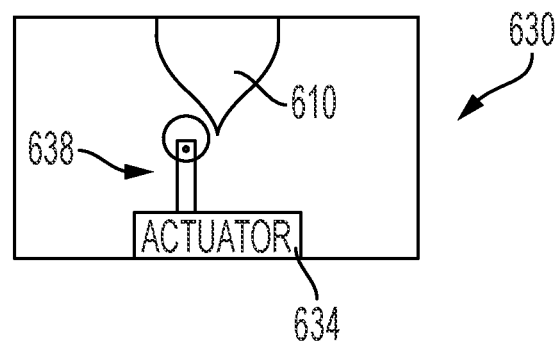
FIG. 6C is an illustration of an abrasive reconditioning station that can be used in the process of FIG. 5.

The conditioning station 604 shown in FIG. 6A thermally treats the nozzle of the removable vessel to remove the solid metal drops. In this station, a heater 608 is activated to heat the exterior of the nozzle 610 to a temperature sufficient to melt the solid metal drops. Once the drops have melted, an actuator 612 is activated to spin the platform 614 to which the vessel is secured at a speed that produces a centrifugal force that casts off the melted metal drops. The conditioning station 620 shown in FIG. 6B chemically treats the nozzle of the removable vessel to remove the solid metal drops. In this station, an applicator, such as a sprayer 624, applies one or more chemicals to the external surface of the nozzle to etch or otherwise erode the solid metal drops from the nozzle. The conditioning station 630 shown in FIG. 6C mechanically treats the nozzle of the removable vessel to remove the solid metal drops. In this station, an actuator 634 is operated to press an abrasive tool, such as a spinning abrasive wheel 638 against the external surface of the nozzle to grind or otherwise polish the solid metal drops from the nozzle.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
    an ejector head having a removable vessel with a receptacle within the removable vessel;
    a heater configured to form a volume between the heater and the removable vessel and to heat the removable vessel while the removable vessel is in the ejector head to a temperature sufficient to melt solid metal within the receptacle of the removable vessel;
    a platform positioned opposite the ejector head;
    at least one actuator operatively connected to at least one of the platform and the ejector head, the at least one actuator being configured to move the platform and the ejector head relative to one another;
    a supply of gas operatively connected to the volume between the heater and the removable vessel so gas from the supply of gas flows through the volume and by a nozzle in the removable vessel to insulate drops of melted metal from ambient air while the drops of melted metal are in flight toward the platform;
    a coil of electrical wire configured to be adjacent to and outside of the heater;
    a source of electrical current;
    a switch operatively connected between the coil of electrical wire and the source of electrical current;
    the ejector head including at least one wall that encloses a chamber, the chamber being configured to form a volume about the coil of electrical wire, the heater, and the removable vessel, the at least one wall having a first port for receiving a fluid and a second port for egress of the fluid, a supply of fluid, a pump operatively connected between the supply of fluid and the first port of the at least one wall, the pump being configured to move fluid from the supply of fluid into the first port so the fluid moves through the chamber before the fluid exits the chamber through the second port, and a heat exchanger operatively connected to the second port, the heat exchanger receiving fluid from the chamber in response to the pump moving fluid into the first port, the heat exchanger being configured to remove heat from the fluid passing through the second port; and
    a controller operatively connected to the heater, the ejector head, and the at least one actuator, the controller being configured to:
        operate the heater to melt the solid metal within the receptacle of the removable vessel;
        operate the switch to connect the coil of electrical wire selectively to the source of electrical current to eject the drops of melted metal from the nozzle of the removable vessel toward the platform; and
        operate the at least one actuator to move the ejector head and the platform relative to one another while the ejector head is ejecting the melted metal drops from the nozzle of the removable vessel toward the platform.

2. The metal drop ejecting apparatus of claim 1 wherein the heat exchanger is operatively connected to the supply of fluid to return the fluid to the supply of fluid after the heat has been removed from the fluid by the heat exchanger.

3. The metal drop ejecting apparatus of claim 2, the removable vessel further comprising:
    a first housing; and
    a second housing, the first housing and the second housing are configured for separation and securement to one another to form the removable vessel selectively.

4. The metal drop ejecting apparatus of claim 3, the first housing further comprising:
    a first opening in an end of the first housing that is opposite an end of the first housing that is configured to be secured with the second housing to form the removable vessel, the first opening being configured to receive bulk metal wire from a supply of bulk metal wire and direct the bulk metal wire into the receptacle of the removable vessel.

5. The metal drop ejecting apparatus of claim 4 wherein the second housing includes a nozzle at an end of the second housing that is opposite another end of the second housing that is configured to be secured to the first housing.

6. The metal drop ejecting apparatus of claim 5, the receptacle within the removable vessel being elongated and rounded within the first housing and being bulbous shaped within the second housing.

7. The metal drop ejecting apparatus of claim 6, the bulbous shaped portion of the receptacle in the second housing being shorter in length than the elongated and rounded shaped portion of the receptacle in the first housing.

8. The metal drop ejecting apparatus of claim 7 wherein a narrowest portion of the bulbous shaped portion of the receptacle in the second housing is adjacent to the nozzle in the second housing.

9. The metal drop ejecting apparatus of claim 8 wherein the first housing and the second housing are formed with high temperature ceramic material.

10. The metal drop ejecting apparatus of claim 9 wherein the first housing is formed with a first high temperature ceramic material and the second housing is formed with a second high temperature ceramic material that is different than the first high temperature ceramic material.

11. The metal drop ejecting apparatus of claim 10 wherein the first high temperature ceramic material is boron nitride and the second high temperature ceramic material is graphite.

12. A metal drop ejecting apparatus comprising:
    an ejector head having a removable vessel with a receptacle within the removable vessel;
    a heater configured to form volume between the heater and the removable vessel and the heater is configured to heat the removable vessel while the removable vessel is in the ejector head to a temperature sufficient to melt solid metal within the receptacle of the removable vessel;

a platform positioned opposite the ejector head;

at least one actuator operatively connected to at least one of the platform and the ejector head, the at least one actuator being configured to move the at least one of the platform and the ejector head relative to one another;

a supply of gas operatively connected to the volume between the heater and the removable vessel so gas from the supply of gas flows through the volume and by a nozzle in the removable vessel to insulate drops of melted metal from ambient air while the drops of melted metal are in flight toward the platform; and a controller operatively connected to the heater, the ejector head, and the at least one actuator, the controller being configured to:

operate the heater to melt the solid metal within the receptacle of the removable vessel;

operate the ejector head to eject the drops of melted metal toward the platform; and operate the at least one actuator to move the ejector head and the platform relative to one another while the ejector head is ejecting the melted metal drops toward the platform.

13. The metal drop ejecting apparatus of claim 12 further comprising:

a coil of electrical wire configured to be adjacent to and outside of the heater;

a source of electrical current;

a switch operatively connected between the coil of electrical wire and the source of electrical current; and the controller being further configured to operate the switch to connect the coil of electrical wire selectively to the source of electrical current to eject drops from the nozzle of the removable vessel.

14. The metal drop ejecting apparatus of claim 12, the removable vessel further comprising:

a first housing; and a second housing, the first housing and the second housing are configured for separation and securement to one another to form the removable vessel selectively.

15. The metal drop ejecting apparatus of claim 14, the first housing further comprising:

a first opening in an end of the first housing that is opposite an end of the first housing that is configured to be secured with the second housing to form the removable vessel, the first opening being configured to receive bulk metal wire from a supply of bulk metal wire and direct the bulk metal wire into the receptacle of the removable vessel.

16. The metal drop ejecting apparatus of claim 15 wherein the second housing includes a nozzle at an end of the second housing that is opposite another end of the second housing that is configured to be secured to the first housing.

17. The metal drop ejecting apparatus of claim 16, the receptacle within the removable vessel being elongated and rounded within the first housing and being bulbous shaped within the second housing.

18. The metal drop ejecting apparatus of claim 17, the bulbous shaped portion of the receptacle in the second housing being shorter in length than the elongated and rounded shaped portion of the receptacle in the first housing.

19. The metal drop ejecting apparatus of claim 18 wherein a narrowest portion of the bulbous shaped portion of the receptacle in the second housing is adjacent to the nozzle in the second housing.

20. The metal drop ejecting apparatus of claim 19 wherein the first housing and the second housing are formed with high temperature ceramic material.

21. The metal drop ejecting apparatus of claim 20 wherein the first housing is formed with a first high temperature ceramic material and the second housing is formed with a second high temperature ceramic material that is different than the first high temperature ceramic material.

22. The metal drop ejecting apparatus of claim 21 wherein the first high temperature ceramic material is boron nitride and the second high temperature ceramic material is graphite.

* * * * *